(12) United States Patent
Colombo et al.

(10) Patent No.: US 10,248,459 B2
(45) Date of Patent: Apr. 2, 2019

(54) OPERATING SYSTEM SUPPORT FOR GAME MODE

(71) Applicant: Microsoft Technology Licensing, LLC, Redmond, WA (US)

(72) Inventors: Gregory John Colombo, Kirkland, WA (US); Logananth Seetharaman, Kirkland, WA (US); Graham Wong, Kirkland, WA (US); Mehmet Iyigun, Kirkland, WA (US); Steven Michel Pronovost, Woodinville, WA (US); Thomas Fahrig, Redmond, WA (US); Thobias Jones, Kirkland, WA (US); Michael Charles Crandall, Kirkland, WA (US); James Andrew Goossen, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 150 days.

(21) Appl. No.: 15/199,665

(22) Filed: Jun. 30, 2016

(65) Prior Publication Data

US 2017/0269968 A1 Sep. 21, 2017

Related U.S. Application Data

(60) Provisional application No. 62/308,729, filed on Mar. 15, 2016.

(51) Int. Cl.
*G06F 9/50* (2006.01)
*G06F 9/48* (2006.01)
*G06F 9/54* (2006.01)

(52) U.S. Cl.
CPC .......... *G06F 9/5011* (2013.01); *G06F 9/4881* (2013.01); *G06F 9/5027* (2013.01); *G06F 9/5061* (2013.01); *G06F 9/546* (2013.01)

(58) Field of Classification Search
None
See application file for complete search history.

(56) References Cited

U.S. PATENT DOCUMENTS 6,128,713 A 10/2000 Eisler et al.
6,678,802 B2 * 1/2004 Hickson ................ G06F 9/5016
711/151

(Continued)

FOREIGN PATENT DOCUMENTS

EP 2657874 A2 10/2013
WO 2014137007 A1 9/2014

OTHER PUBLICATIONS

Abdel-Wahab et al "Distributed Management of Exclusive Resources in Collaborative Multimedia Systems", 1998 IEEE, 5 pages.*

(Continued)

*Primary Examiner* — Van H Nguyen
(74) *Attorney, Agent, or Firm* — Workman Nydegger (57) ABSTRACT

Embodiments disclosed herein are related to systems, methods, and computer readable medium for allocating one or more system resources for the exclusive use of an application. The embodiments include receiving a request for an exclusive allocation of one or more system resources for a first application, the one or more system resources being useable by the first application and one or more second applications; determining an appropriate amount of the one or more system resources that are to be allocated exclusively to the first application; and partitioning the one or more system resources into a first portion that is allocated for the exclusive use of the first application and a second portion that is not allocated for the exclusive use of the first application, the second portion being available for the use of the one or more second applications.

18 Claims, 6 Drawing Sheets

(56) References Cited

U.S. PATENT DOCUMENTS

| | | | |
|---|---|---|---|
| 6,981,044 B1* | 12/2005 | Coez | H04L 12/2805 375/E7.019 |
| 7,677,979 B2 | 3/2010 | Van Luchene | |
| 8,078,824 B2 | 12/2011 | Sugumar et al. | |
| 8,707,317 B2 | 4/2014 | Goossen et al. | |
| 8,924,959 B2 | 12/2014 | Liu | |
| 9,116,750 B2* | 8/2015 | Archer | G06F 9/5061 |
| 9,201,693 B2 | 12/2015 | Fuller et al. | |
| 9,374,243 B1* | 6/2016 | Certain | G06Q 30/08 |
| 2008/0090659 A1* | 4/2008 | Aguilar | A63F 13/12 463/42 |
| 2009/0275407 A1* | 11/2009 | Singh | G07F 17/32 463/31 |
| 2012/0159090 A1* | 6/2012 | Andrews | G06T 1/20 711/153 |
| 2012/0283018 A1 | 11/2012 | Berner et al. | |
| 2013/0212600 A1 | 8/2013 | Harsh et al. | |
| 2014/0344457 A1 | 11/2014 | Bruno et al. | |
| 2015/0346884 A1 | 12/2015 | Tomicic et al. | |

OTHER PUBLICATIONS

Sanden "Simultaneous exclusive access to multiple resources", 2011 IEEE, pp. 197-227.*
International Search Report and the Written Opinion issued in PCT Patent Application No. PCT/US2017/021235 dated Jun. 1, 2017.
Hoffman, Chris, "Benchmarked: Will a "Game Booster" Improve Your PC Gaming Performance?", Published on: Sep. 6, 2013 Available at: http://www.howtogeek.com/171734/benchmarked-will-a-game-booster-improve-yourr-pc-gaming-performance/.
Sakr, Sharif, "Xbox One runs three operating systems, including cut-clown Windows for apps", Published on: May 1, 2013 Available at: http://www.engadget.com/2013/05/21/xbox-one-runs-three-operating-systems/.

* cited by examiner

OPERATING SYSTEM SUPPORT FOR GAME MODE

CROSS-REFERENCE TO RELATED APPLICATIONS

This application is a non-provisional of and claims priority from and the benefit of U.S. Provisional Patent Application Ser. No. 62/308,729 filed on Mar. 15, 2016 and entitled "OPERATING SYSTEM SUPPORT FOR GAME MODE," which application is hereby expressly incorporated herein in its entirety.

BACKGROUND

Games and other high-end applications that run on a multitask platform such as an operating system may perform best when they have are given consistent access to one or more system resources such as processing time, graphics processing capabilities, Input/Output (I/O) bandwidth, and dedicated memory. Users who want to run the game or high-end application side-by-side with other workloads and applications currently need to accept that running more programs outside of the game or high-end application may hurt performance. In addition, the game or high-end application may not perform predictably, since the system may frequently alternate between performing various tasks outside of the game or high-end application and performing tasks in the game or high-end application.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to systems, methods, and computer readable medium for allocating one or more system resources for the exclusive use of an application. In one embodiment, a computing system includes a processor and a storage device that stores computer-executable instructions which, when executed by the processor, cause the computing system to perform the following: receive a request for an exclusive allocation of one or more system resources for a first application, the one or more system resources being useable by the first application and one or more second applications; determine an appropriate amount of the one or more system resources that are to be allocated exclusively to the first application; and partition the one or more system resources into a first portion that is allocated for the exclusive use of the first application and a second portion that is not allocated for the exclusive use of the first application, the second portion being available for the use of the one or more second applications.

Another embodiment is related to a resource manager that partitions system resources for the exclusive use of an application. The resource manager includes a negotiation module that negotiates with an application to determine an allocation of system resources that the application desires for its exclusive use. The resource manager includes an access module that verifies that the application is authorized for the allocation of the system resources for its exclusive use. The resource manager includes a partitioning module that causes the generation of a partition of the system resources so as to provide the desired allocation of the system resources for the exclusive use of the application.

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Games and other high-end applications that run on a multitask platform may perform best when they have are given consistent access to one or more system resources such as processing time, graphics processing capabilities, Input/Output (I/O) bandwidth, and dedicated memory. Users who want to run the game or higher-end application side-by-side with other workloads and applications currently need to accept that running more programs outside of the game or higher-end application may hurt performance. In addition, the game or higher-end application may not perform predictably, since the system may frequently alternate between performing various tasks outside of the game or higher-end application and performing tasks in the game or higher-end application.

Aspects of the disclosed embodiments relate to the creation and use of computing systems that implement a centralized resource manager that decides how to partition the system resources so that an appropriate amount of the system resources may be allocated to the exclusive use of a game or higher-end application. This may be accomplished by a negotiation process between the resource manager and the game or high-end application.

Once the resource manager has decided how to partition the system resources so that the appropriate amount of the system resources may be allocated to the exclusive use of a game or high-end application, the resource manager may utilize the underlying operating system mechanisms to perform the partition. The resource manager may then inform the game or high-end application of the allocation of system resources that are to be for its exclusive use. The resource manager may monitor the system and make adjustments to the exclusive allocation as warranted by overall system performance.

There are various technical effects and benefits that can be achieved by implementing aspects of the disclosed embodiments. By way of example, the use of exclusively allocated system resources disclosed in the embodiments significantly improves the user experience as the game or other higher-end application should have sufficient system resources to operate in an optimum manner. In addition, the use of the negotiation helps ensure that the amount of resources to be exclusively allocated are the appropriate amount so that the exclusive allocation does not include too much or too little system resources. This in turn helps to ensure that the system resources are allocated in an efficient manner.

Some introductory discussion of a computing system will be described with respect to FIG. 1. Then, the performance of a computing system for exclusively allocating one or more system resources will be described.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
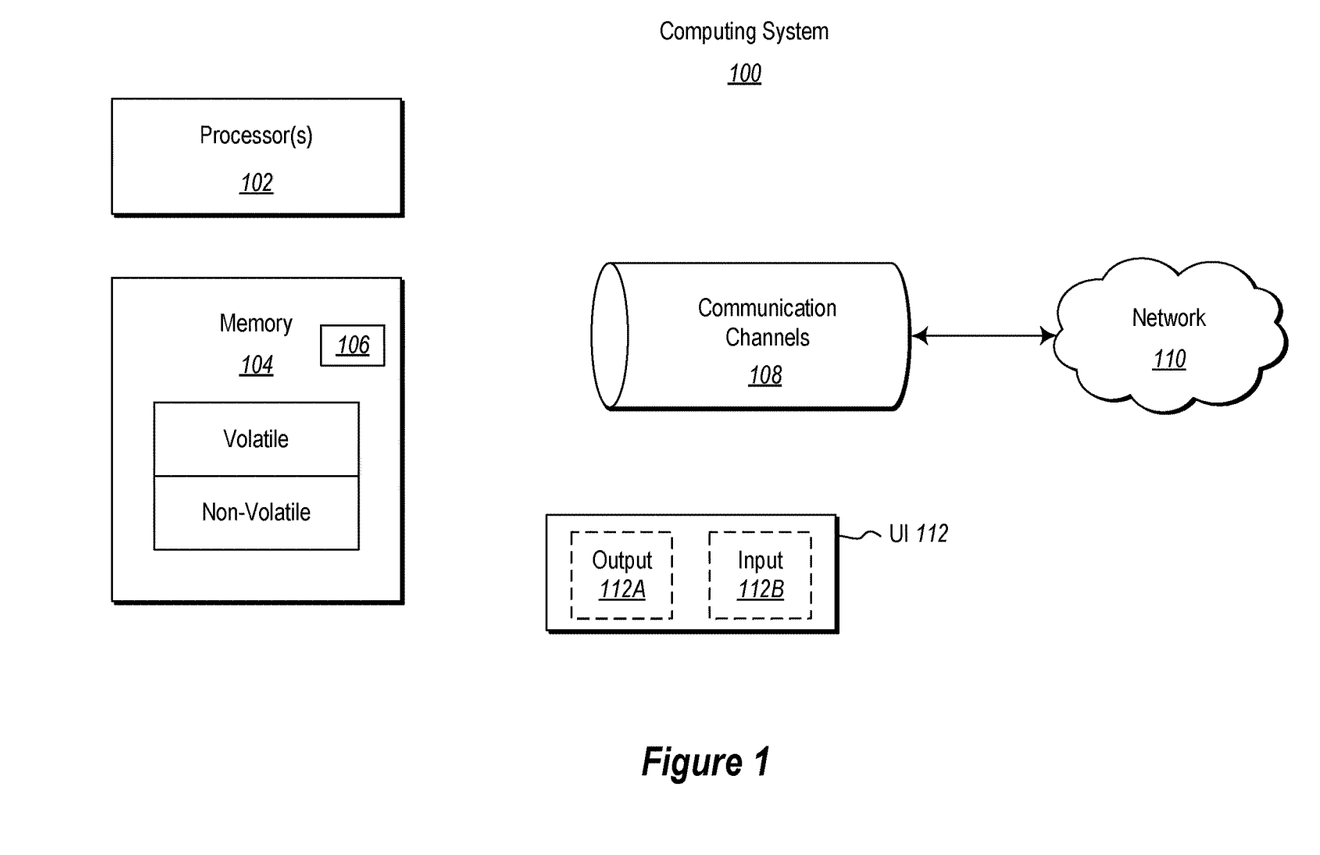
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
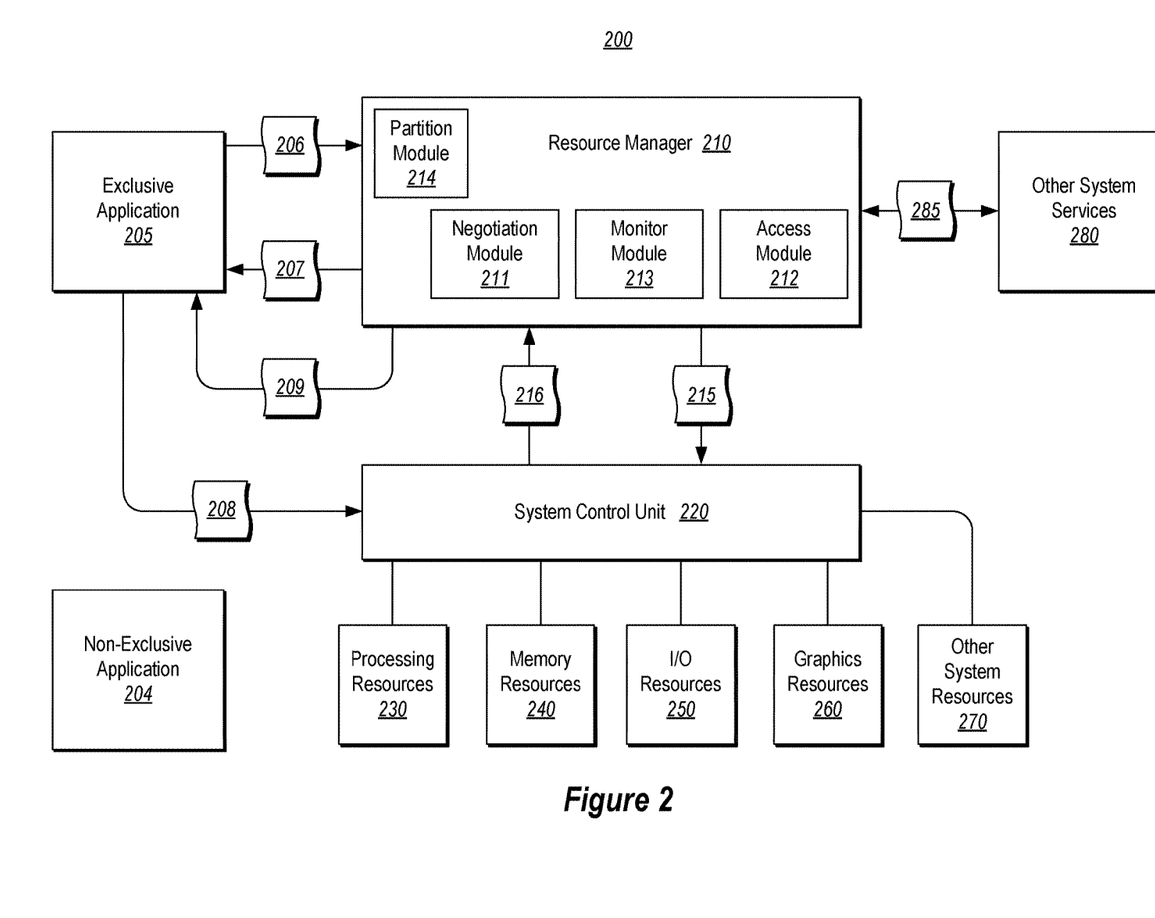
FIG. 2 illustrates an embodiment of a computing system able to allocate system resources for the exclusive use of an application.

Attention is now given to FIG. 2, which illustrates an embodiment of a computing system 200, which may correspond to the computing system 100 previously described. The computing system 200 includes various modules or functional blocks that may implement the various embodiments disclosed herein as will be explained. The various modules or functional blocks of computing system 200 may be implemented on a local computing system or may be implemented on a distributed computing system that includes elements resident in the cloud or that implement aspects of cloud computing. The various modules or functional blocks of the computing system 200 may be implemented as software, hardware, or a combination of software and hardware. The computing system 200 may include more or less than the modules illustrated in FIG. 2 and some of the modules may be combined as circumstances warrant. Although not necessarily illustrated, the various modules of the computing system 200 may access and/or utilize a processor and memory, such as processor 102 and memory 104, as needed to perform their various functions.

As illustrated in FIG. 2, the computing system 200 may execute an exclusive application or program 205 and a non-exclusive application or program 204. The exclusive application or program 205 may be considered an "exclusive application" because it is an application that desires to acquire exclusive use of one or more system resources such as processing resources or memory resources while in operation. The non-exclusive application or program 204 may be any application or program that is not an exclusive application and does not acquire exclusive use of the one or more system resources. Prior to any allocation of the system resources for the exclusive use of the exclusive application 205, both the exclusive application 205 and the non-exclusive application 204 may share use of the system resources as circumstances warrant.

In one embodiment, the exclusive application 205 may be a game or other high-end application that performs best when it has consistent access to the one or more system resources and/or that provides a more satisfying experience to a user when it as consistent access to the one or more system resources. Accordingly, the embodiments disclosed herein are not limited by the type of application constituting exclusive application 205 as exclusive application 205 may be any reasonable application desiring exclusive use of the one or more system resources as previously explained.

The computing system 200 may include a resource manager 210, which may part of a computing system operating system. In operation, the resource manager 210 may determine what system resources, if any, to exclusively allocate to the exclusive application 205. The resource manager may then utilize various system mechanisms to partition off the one or more system resources that are to be for the exclusive use of the exclusive application 205. This process will be described in more detail to follow. It will be noted that the term "exclusive use" as used herein also includes near exclusive or substantially exclusive use. Accordingly, the embodiments described herein do not require 100 percent exclusive use by the exclusive application 205 as the embodiments anticipate near exclusive use.

For example, in one embodiment, the exclusive application 205 may send a request 206 to the resource manager 210. The request 206 may inform the resource manager 210 that the exclusive application 205 desires the exclusive use of the one or more system resources. The request 206 may also specify the level of system resources that are desired.

In one embodiment, the request 206 may be in the form of a negotiation between the exclusive application 205 and the resource manager 210. Accordingly, the resource manager 210 may include a negotiation module 211 that in operation handles the negotiation with the exclusive application 205. The negotiation module 211 may be an API that the exclusive application 205 calls to start the negotiation process or to simply send the request 206.

Figure 3:
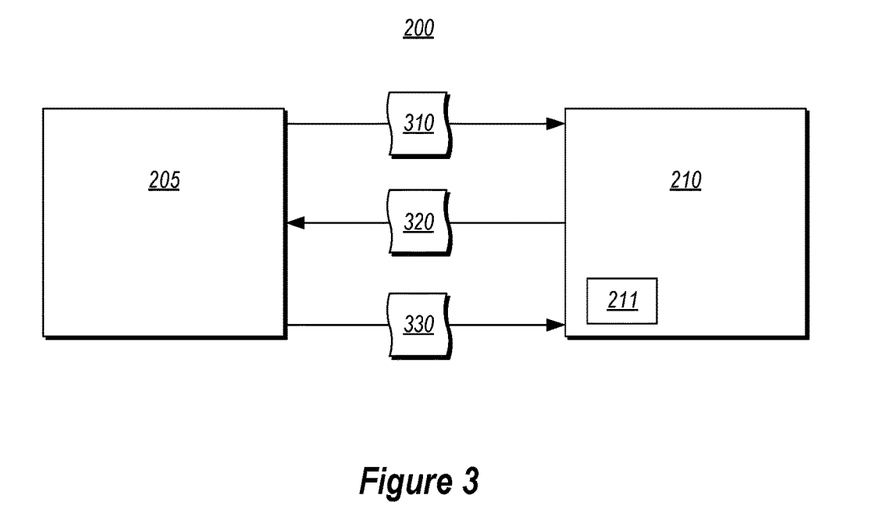
FIG. 3 illustrates an example embodiment of a negotiation process for the allocation of system resources for the exclusive use of an application.

FIG. 3 illustrates an embodiment of the negotiation between the exclusive application 205 and the resource manager 210. As illustrated at 310, the exclusive application 205 may ask the resource manager 210 for the maximum possible system resource allotment that the resource manager 210 is able to provide for the exclusive use of the exclusive application 205. That is, given that the resource manager 210 may need to set aside some portion of the system resources for the use of other applications that may need to run on computing system 200, the exclusive application 205 may desire to know the maximum allocation of system resources that can reasonably be given for its exclusive use.

As illustrated at 320, the resource manager 210 may inform the exclusive application 205 of the maximum allocation of system resources that may be reasonably allocated for the exclusive use of the exclusive application 205. The exclusive application 205 may then determine if it requires the use of the all the system resources that the resource manager 210 is able to allocate to its exclusive use or if it requires less of the system resources than the resource manager is able to allocate to its exclusive use.

For example, suppose that the system resources include eight processors and 16 GB of RAM and that the resource manager 210 is able to allocate six of the processors and 12 GB of the RAM to the exclusive use of the exclusive application 205. If the exclusive application 205 is a high-end game that requires a large amount of the system resources to operate consistently, then the exclusive application 205 may determine that it may reasonably require the use of the six processors and 12 GB of RAM. On the other hand, if the exclusive application 205 is simple game such as Solitaire or the like that requires a much smaller amount of system resources than the high-end game, then the exclusive application 205 may determine that it requires the use of significantly less than the six processors and 12 GB of RAM that may be allocated for its exclusive use and so may determine what subset of the allocated system resources that it actually requires.

As illustrated at 330, the exclusive application 205 may return its maximum desired system resource allocation to the resource manager 210 and request that resource manger 210 partition the system resources accordingly. The maximum desired system resource allocation may specify the portion or amount of the system resources that the resource manager 210 is able to allocate to the exclusive use of the exclusive application 205 that the exclusive application 205 actually requires the use of. As will be described in more detail to follow, the resource manager 210 may attempt to give the exclusive application 205 either the best possible system resource allotment given the overall system conditions or the exclusive application 205's supplied maximum desired system resource allotment, whichever is less.

Returning to FIG. 2, the resource manager 210 may evaluate the request 206 to determine whether to implement the exclusive application 205's request for the exclusive use of the system resources. In one embodiment, the resource manager 210 may include an access module 212 which allows a user of the computing system 200 to configure or specify which applications are entitled to exclusive use of one or more of the system resources, for example by providing a list of applications that are entitled to exclusive use of one or more of the system resources. Accordingly, the access module 212 may determine if the exclusive application 205 is an application that is approved for exclusive use of the system resources and may decline the request if the exclusive application is not approved.

In other embodiments, the access module 212 or another portion of the resource manager 210 may determine if the exclusive application 205 is active and if the user is interacting with the exclusive application. If the exclusive application 205 is not active and/or the user is not interacting with the exclusive application 205, the resource manager 210 may not allocate the exclusive system resources. As will be appreciated, if the exclusive application 205 is not active, it may be a waste of system resources to allocate exclusive system resources to the exclusive application 205 in such circumstances as the exclusive application 205 may not make use of the exclusive system resources.

If the request 206 is not permitted for the reasons discussed above or for any other reason, the resource manager 210 may open a communication channel illustrated at 207 to inform the exclusive application 205 that its request for exclusive access to the one or more system resources will not be honored.

When the request 206 is permitted, a partition module 214 of the resource manager 210 may determine how much of the system resources to allocate to the exclusive use of the exclusive application 205. This determination may be based on the exclusive application's supplied maximum desired system resource allotment discussed above. The determination may be based on other factors as will be explained.

For example, the partition module 214 may consider the overall system resources of the computing system 200 and the number and kinds of other applications that are currently active and their current system resource requirements. As will be appreciated, the resource manager 210 is only able to allocate system resources up to the actual number of resources that are included in the computing system 200. In addition, the resource manager 210 may also need to leave enough system resources so that the other active applications have access to enough system resources to achieve at least a minimally acceptable level of operation.

In addition, the partition module 214 may need to determine whether any of the other applications known to the resource manager 210 are also exclusive applications that have requested exclusive system resource allocation in a manner similar to exclusive application 205. In such circumstance, the resource manager may have to allocate less than the maximum desired system resource allotment to the exclusive application 205 and the one or more other exclusive applications in order to meet the system resource needs of all the active applications.

In some embodiments, the user, through the use of the access module 212, may be able to designate a priority for the various exclusive applications so that an exclusive application with a higher priority has an allocation of exclusive system resources closer to its maximum desired system resource allotment than an exclusive application with a lower priority. If the exclusive application with the higher priority later becomes inactive, the resource manager may reallocate the exclusive system resources based on the priority of the remaining active exclusive applications.

The partition module 214 may also consider the resource usage history of exclusive application 205. If exclusive application 205 has a history of using less than its maximum desired system resource allotment, then the resource manager 210 may allocate less than the maximum desired system resource allotment even when the exclusive application 205 requests the maximum so as not to commit system resources that will likely not be used. It will be appreciated that the partition module 214 of the resource manager 210 may consider factors other than those discussed herein when determining how much of the system resources to exclusively allocate to exclusive application 205.

As illustrated in FIG. 2, the computing system 200 further includes a system control unit 220, which is some embodiments may be an operating system kernel. When the resource manager 210 has determined, as discussed above, how much of the system resources to allocate exclusively to exclusive application 205, whether it be the maximum desired system resource allotment or some other amount, the resource manager 210 may direct the system control unit 220 to implement some or all of the system resource allocation and partitioning as illustrated by 215. It will be appreciated that the exact way that the system control unit 220 implements the system resource allocation and partitioning may be dependent on what type of platform implements the computing system 200. Accordingly, the embodiments disclosed herein are not limited by how the system control unit 220 implements the system resource allocation and partitioning.

In one embodiment, the system control unit 220 controls or otherwise directs the partitioning of one or more of system resources including processing resources 230, memory resources 240, input/output (I/O) resources 250, and graphic processing resources 260. Other system resources 270 represent that there may be additional system resources that may be allocated and partitioned for use by the exclusive application 205 that are not explicitly discussed herein. In other embodiments, the resource manager 210 may directly control the partitioning of the one or more system resources.

Figure 4:
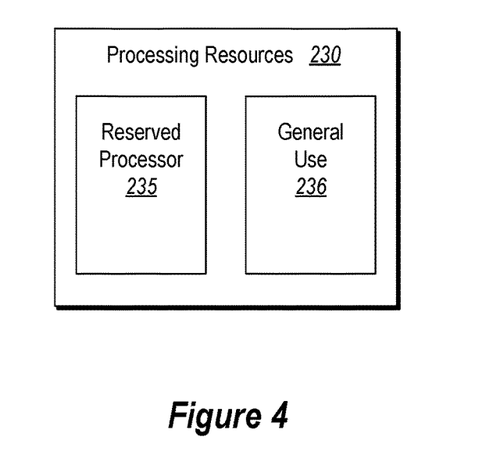
FIG. 4 illustrates a partitioning of processing resources into a portion for the exclusive use of an application and a portion for the use of other applications.

For example, as shown in FIG. 4, the resource manager 210 may direct the system control unit 220 to partition the available processors of processing resources 230 into reserved processors 235 and general use processors 236. Thus, in an embodiment where the processing resources 230 include eight processors, the system control unit 220 may include six of the processors in the reserved processors 235 and the remaining two processors in the general use processors 236.

The system control unit 220 may then relegate all active applications, such as non-exclusive application 204, that have not been identified as being an exclusive application to the use of the general use processors 236. That is, the system control unit 220 is directed to not allow any but the exclusive application 205 to schedule threads for execution on the reserved processors 235. In this way, exclusive application 205 is given exclusive use of the processors of reserved processors 235. It will be appreciated that in some embodiments the use may be nearly exclusive as the control unit 220 may be configured to handle interrupts or like processes on one or more of the processors of reserved processors 235 or may be configured to run specifically affinitized threads on a particular processor of reserved processors 235. It will also be appreciated that in some embodiments, the exclusive application 205 may also have access to the general use processors 236 in addition to the reserved processors 235. Accordingly, the embodiments disclosed herein do not limit the exclusive application to only the use of the one or more system resources that have allocated for its exclusive use as in some embodiments, the exclusive application may also access the one or more system resources not allocated for its exclusive use.

Figure 5:
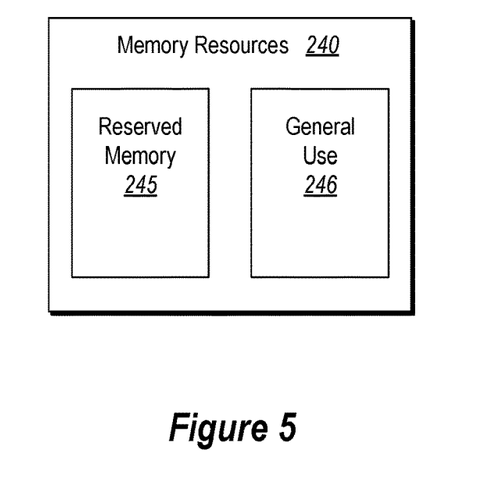
FIG. 5 illustrates a partitioning of memory resources into a portion for the exclusive use of an application and a portion for the use of other applications.

In like manner, the system control unit 220 may control or otherwise direct the partitioning of memory resources 240. As shown in FIG. 5, the resource manager 210 may direct the system control unit 220 to partition memory resources 240 into reserved memory 245 and general use memory 246. For example, in an embodiment with 16 GB of RAM available, the system control unit 220 may include 12 GB of RAM in reserved memory 245 and the remaining 4 GB of RAM in general use memory 246. Accordingly, the exclusive application 205 may be given exclusive use of the reserved memory 245 and the non-exclusive applications may be given use of the general use memory 246. As mentioned above, in some embodiments, the exclusive application 205 may also use the general use memory 246.

In some embodiments, the graphic processing resources 260 may also be allocated in various manners to ensure that exclusive application 205 is able to use a major portion of the graphic processing resources. In some embodiments, the allocation of graphic processing resources 260 may be controlled by the system control unit 220 and in other embodiments the allocation may be indirectly controlled by the resource manager 210 by utilizing underlying operating system mechanisms to ensure that the exclusive application 205 is able to use a major portion of the graphic processing resources.

The I/O resources may also be allocated to the primary use of the exclusive application 205. For example the system control unit 220 or the resource manager 210 may direct the disk and networking stacks of the operating system to prioritize traffic from the exclusive application 205.

Once the system control unit 220 has allocated and partitioned the system resources as directed by the resource manager 210, this may be communicated to the resource manager as illustrated at 216 in FIG. 2. The resource manager 210 may then communicate the resource allocation information to the exclusive application 205 as illustrated by 209.

The resource allocation information 209 may indicate disposition of the request 206, such as if the request 206 will be honored as discussed above, if the resource manager 210 is waiting to partition the system resources, or whether the request 206 was successful. If the request was successful, information about the specific system resources that have been exclusively allocated to the exclusive application 205 may be included in the information 209. This may include information identifying the processing resources, such as reserved processing 235, and memory resources, such as reserved memory resources 245, that have been exclusively allocated to the exclusive application 205. The information may also include performance characteristics of the processing resources and information related to other applications that may have at least some access to the allocated processing resources. It will be appreciated that the resource allocation information 209 may include any reasonable information that informs the exclusive application 205 of the system resources that have been allocated for its exclusive use and information on how to access these system resources.

In some embodiments, the computing system may include other system services 280 that the resource manager 210 does not control directly but that may want to be "good citizens" when the resource manager is trying to maximize the resources exclusively available for the exclusive application 205. Accordingly, the resource manager 210 may define a broadcast channel to which these components can subscribe as illustrated at 285. The broadcast 285 may request that the other system services 280 delay any low-priority activities while the exclusive application 205 is active so that more resources may be allocated accordingly.

For example, indexing files to display them as search results is a relatively low-priority activity; the component of other system services 280 that decides when to schedule this task may choose to suppress it while the resource manager is devoting system resources to the exclusive application 205. The resource manager 210 may update the broadcast 285 if the exclusive application 205 becomes inactive and the other system services 280 may resume their activity. If the exclusive application 205 becomes active again at a later time, the broadcast 285 may again be updated and the other system services 280 may suppress their activity.

In some embodiments, the exclusive application 205 may need to take special actions to begin to use the system resources that have been allocated to its exclusive or near-exclusive use. For example, as illustrated at 208 the exclusive application 205 may need to make a special call to one or more API's of the system control unit 220 or to the processing resources 230 to schedule threads onto the processors of reserved processors 235. Although the call 208 is shown as being received by the system control unit 220, this is for ease of illustration only. It will be appreciated that the call 208 may be received by any of the appropriate system resources as needed to ensure the exclusive application is able to access those resources. In addition, there may be any number of calls 208 to as many of the system resources as needed.

As illustrated, the resource manager 210 may also include a monitor module 213. The monitor module 213 may be configured to monitor the various applications, including the exclusive application 205, to ensure the stability of computing system 200. For example, if the monitor module 213 determines that exclusive application 205 is no longer active or no longer requires the exclusive use of the allocated system resources, the monitor module 213 may cause the resource manager 210 to update broadcast 285 as previously described. In addition, the monitor module 213 may cause the resource manager 210 to use the communication channel 207 to inform the exclusive application 205 that it can no longer have an exclusive resource allocation. If the monitor 213 later determines that the exclusive application 205 is once again active and in need of the exclusive resource allocation, it may then cause the system resource manager 210 to allocate the system resources in the manner previously described.

In some embodiments, the monitor module 213 may determine during operation of the exclusive application 205 that the overall system performance is insufficient due to the exclusive allocation of the system resources because the non-exclusive system resources are overtaxed by the other operating applications. In such a circumstance, the monitor module 213 may cause the resource manager 210 to determine a new, lower level of resources that may be exclusively allocated to the exclusive application 205 that will leave enough resources for the other applications. This new allocation information 209 may then be communicated to the exclusive application 205. In this way, the exclusive application 205 will still receive some level of exclusive use of the system resources, although perhaps not the maximum possible exclusive system resource allotment, while the overall performance of computing system 200 is improved.

In like manner, if the monitor module 213 determines during operation of the exclusive application 205 that additional system resources have become available for use by the exclusive application, the monitor module 213 may cause the resource manager 210 to allocate more system resources for the exclusive application 205. This new allocation information 209 may then be communicated to the exclusive application.

Figure 6:
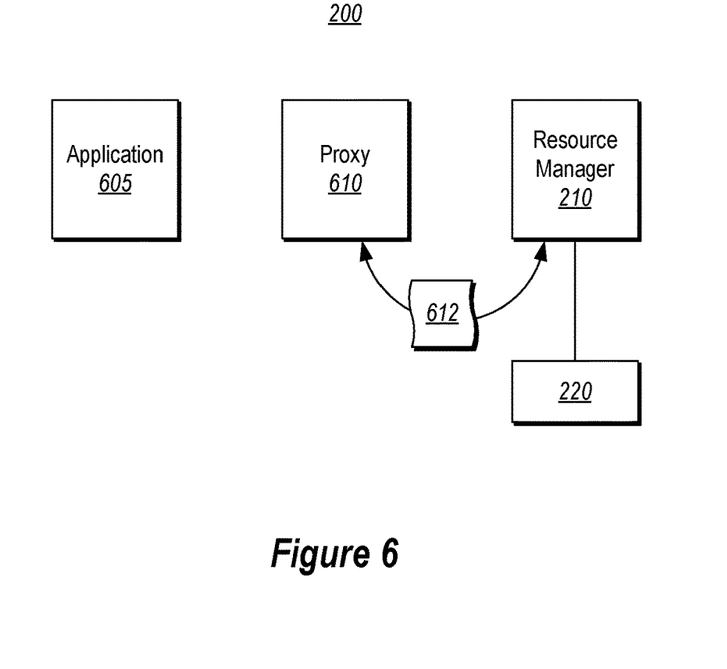
FIG. 6 illustrates a proxy component in accordance with the embodiments disclosed herein.

Attention is now given to FIG. 6, which illustrates an alternative embodiment of computing system 200. As shown in the figure, the computing system 200 includes the resource manager 210 and system control unit 220 as in the previously described embodiment shown in FIG. 2. Although not illustrated for ease of explanation, the embodiment of FIG. 6 may also include the other system resource elements of computing system 200 described above in the relation to the embodiment of FIG. 2.

The embodiment of FIG. 6 includes an application 605, which in some embodiments may be a game or other high-end application that would benefit from an allocation of the one or more system resource for its exclusive use in the same manner as exclusive application 205 benefits. However, unlike the exclusive application 205, the application 605 may not be an application that is able to request an allocation of the one or more system resource for its exclusive use. For example, the application 605 may be a legacy application or game that is not coded to make the request.

Accordingly, the computing system 200 of this embodiment may also include a proxy component 610. In operation, the proxy component 610 is configured to detect that application 605 is running on the computing system 200. The proxy component 610 may then stand in for the application 605 and may communicate with the resource manager 210 as illustrated at 612. During this communication, the proxy component 610 may initiate a negotiation with the resource manager 210 for allocation of various system resources for the exclusive use of the application 605. This negotiation may occur in the manner previously described in relation to the embodiment of FIG. 2. In addition, the resource manager 210 may allocate and partition the system resources for the exclusive use of the application 605 using system control unit 220 and the other elements of computing system 200 in the manner previously described in relation to the embodiment of FIG. 2.

In this way, although the application 605 is not able to request or negotiate for the exclusive use of the system resources, it is able to obtain exclusive use of the one or more system resources because the proxy component 610 handles the request or negotiation for it. Accordingly, the operation of the application 605 may be improved in a manner that is seamless to the application 605.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
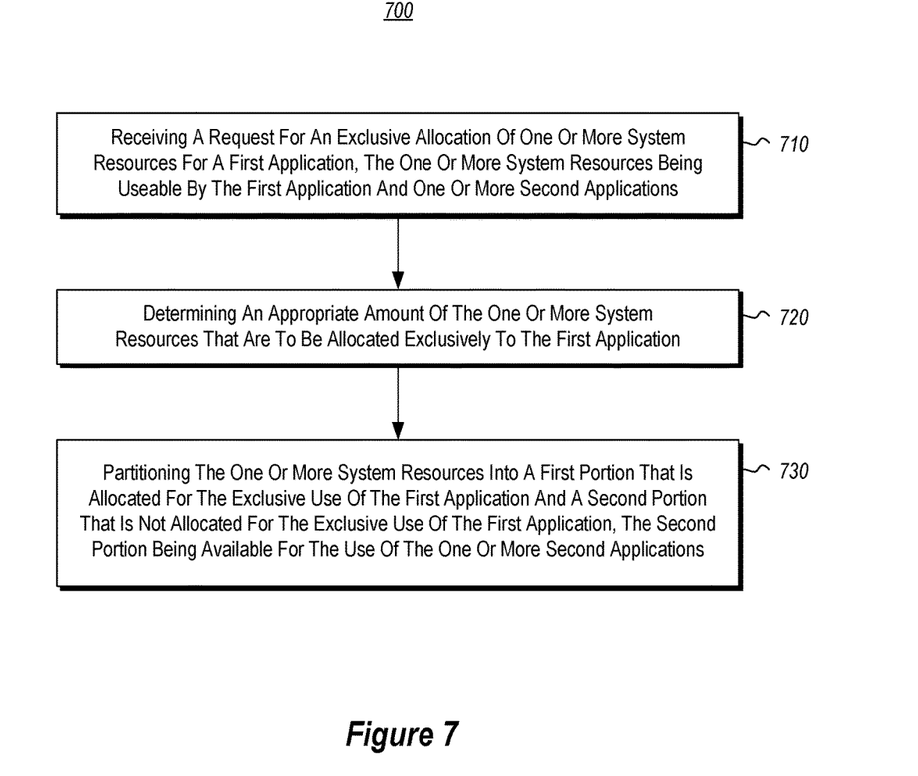
FIG. 7 illustrates a flow chart of an example method for allocating one or more system resources for the exclusive use of an application.

FIG. 7 illustrates a flow chart of an example method 700 for allocating one or more system resources for the exclusive use of an application. The method 700 will be described with respect to one or more of FIGS. 2-6 discussed previously.

The method 700 includes receiving a request for an exclusive allocation of one or more system resources for a first application (act 710). The one or more system resources are useable by the first application and one or more second applications. For example, as previously discussed the resource manager 210 may receive a request for an exclusive allocation of one or more of processing resources 230, memory resources 240, I/O resources, 250, graphics resources 260, or other system resources 270. These system resources, prior to the request, may be useable by the exclusive application 205, the application 605, and one or more non-exclusive applications 204. The request may include a maximum desired allocation of the system resources for exclusive use of the exclusive application 205 or the application 605.

In one embodiment, the request may be received from the exclusive application 205. In another embodiment, the request may be received from the proxy component 610 on behalf of the application 605 that is not able to make the request itself. In some embodiments, as will be discussed in relation to method 800 to follow, the request may comprise a negotiation between the resource manager 210 and the exclusive application 205 or the proxy component 610.

The method 700 also includes determining an appropriate amount of the one or more system resources that are to be allocated exclusively to the first application (act 720). For example, as previously discussed the resource manager 210 and its various modules may determine the appropriate amount of the system resources that may be allocated to the exclusive application 205 or application 605. This determination may be based on the maximum desired allocation that is received by the resource manger 201 in act 710. In addition, this determination may also be based on the other factors previously discussed such as if the exclusive application 205 or application 605 is an application that is approved for the exclusive use of the one or more system resources, if the exclusive application 205 or application 605 is active, if providing the amount of the one or more system resources requested for the exclusive use of the exclusive application 205 or application 605 will leave enough of the system resources for the use of the one or more second applications, if the usage history of the exclusive application 205 or application 605 warrants the exclusive use, and/or if the exclusive application 205 or application 605 have a priority that warrants the exclusive use.

The method 700 further includes partitioning the one or more system resources into a first portion that is allocated for the exclusive use of the first application and a second portion that is not allocated for the exclusive use of the first application, the second portion being available for the use of the one or more second applications (act 730). For example, as previously discussed, the resource manager 210 may direct the system control unit 220 to partition one or more of processing resources 230, memory resources 240, I/O resources 250, graphics resources 260, or other system resources 270 into a first portion for the exclusive use of the exclusive application 205 or the application 605 and into a second portion that is for the use of the one or more non-exclusive applications 204.

For instance, the processing resources 230 may be partitioned into the reserved processors 235 that are for the exclusive use of the exclusive application 205 or the application 605 and the general use processors 236 that are for the use of the use of the one or more non-exclusive applications 204. Likewise, the memory resources 240 may be partitioned into the reserved memory 245 for the exclusive use of the exclusive application 205 or the application 605 and general use memory 246 that are for the use of the use of the one or more non-exclusive applications 204.

Figure 8:
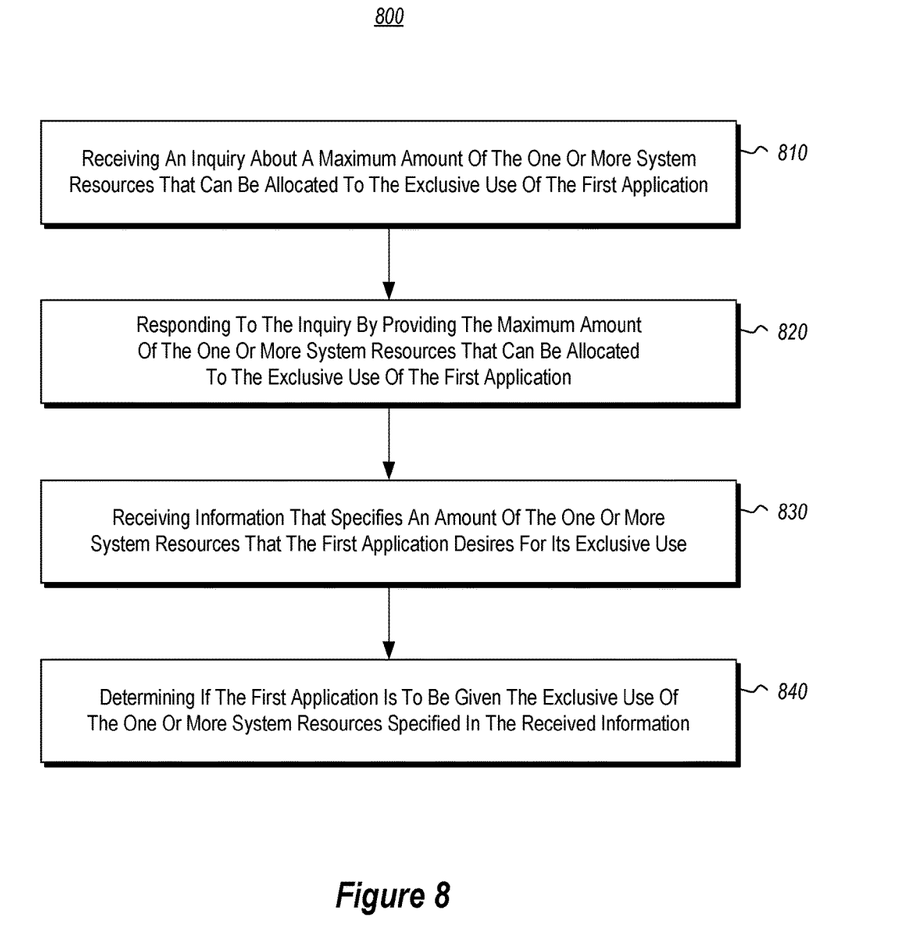
FIG. 8 illustrates a flow chart of an example method for a negotiation process to request the exclusive allocation for one or more system resources for an application.

FIG. 8 illustrates a flow chart of an example method 800 for a negotiation process to request the exclusive allocation for one or more system resources for the first application. The method 800 will be described with respect to one or more of FIGS. 2-6 discussed previously.

The method 800 includes receiving an inquiry about a maximum amount of the one or more system resources that can be allocated to the exclusive use of the first application (act 810). For example, as previously discussed, the resource manager 210 may receive an inquiry, as illustrated at 310, from the exclusive application 205 or the proxy component 610 that inquirers about the maximum amount of the system resources that resource manager may allocate to the exclusive use of the exclusive application 205 or application 605.

The method 800 includes responding to the inquiry by providing the maximum amount of the one or more system resources that can be allocated to the exclusive use of the first application (act 820). For example, as previously discussed, the resource manager 210 may provide, as illustrated at 320, the exclusive application or the proxy component 610 with the maximum amount of the system resources that can be allocated to the exclusive use of the exclusive application 205 or application 605 given the current operational demands of the computing system 200.

The method 800 may also include receiving information that specifies an amount of the one or more system resources that the first application desires for its exclusive use (act 830). For example, as previously discussed, the resource manager 210 may receive, as illustrated at 330, information from the exclusive application 205 or the proxy component 610 that specifies the amount of the system resources the exclusive application 205 or the application 605 reasonably needs. For instance, the exclusive application 205 or the application 605 may reasonably need the maximum amount of the one or more system resources that the resource manager 210 is willing to allocate to its exclusive use and this may be specified in the information received by the resource manager 210. Alternatively, the exclusive application 205 or the application 605 may reasonably need less than the maximum amount of the one or more system resources that the resource manager 210 is willing to allocate to its exclusive use and this may be specified in the information received by the resource manager 210.

The method 800 further includes determining if the first application is to be given the exclusive use of the one or more system resources specified in the received information (act 840). For example, as previously discussed the resource manager 210 may determine how much of the one or more system resources are to be allocated for the exclusive use of exclusive application 205 or the application 605. This determination may be performed in the manner previously discussed in relation to act 720 of method 700.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for allocating one or more system resources for the exclusive use of an application, the computing system comprising:
    at least one processor; and
    at least one storage device having stored thereon computer-executable instructions which, when executed by the at least one processor, cause the computing system to:
        receive a request for an exclusive allocation of one or more system resources for a first application, the one or more system resources being useable by the first application and one or more second applications, wherein receiving the request for the exclusive allocation of the one or more system resources comprises a negotiation process that includes:
            receiving an inquiry about a maximum amount of the one or more system resources that can be allocated to the exclusive use of the first application;
            responding to the inquiry by providing the maximum amount of the one or more system resources that can be allocated to the exclusive use of the first application;
            receiving information that specifies an amount of the one or more system resources that the first application desires for its exclusive use; and
            determining if the first application is to be given the exclusive use of the one or more system resources specified in the received information;
        determine an appropriate amount of the one or more system resources that are to be allocated exclusively to the first application;
        partition the one or more system resources into a first portion that is allocated for the exclusive use of the first application and a second portion that is not allocated for the exclusive use of the first application, the second portion being available for the use of the one or more second applications; and
        provide an indication of a disposition of the request, the indication including information detailing which specific system resources were selected for inclusion in the first portion.

2. The computing system according to claim 1, wherein the first application is a game.

3. The computing system according to claim 1, wherein the request for an exclusive allocation of the one or more system resources is received from the first application.

4. The computing system according to claim 1, wherein the request for an exclusive allocation of the one or more system resources is received from a proxy component on behalf of the first application.

5. The computing system according to claim 1, wherein receiving a request for the exclusive allocation of the one or more system resources comprises exposing an Application Programming Interface (API) where the request can be made.

6. The computing system according to claim 1, wherein the computing system is further caused to perform the following:
    determine if the first application is an application that is approved for the exclusive use of the one or more system resources; and
    when it is determined that the first application is not approved for the exclusive use of the one or more system resources, decline the request for the exclusive use of the one or more system resources.

7. The computing system according to claim 1, wherein the computing system is further caused to perform the following:
    determine if the first application is active; and
    when it is determined that the first application is not active, decline the request for the exclusive use of the one or more system resources.

8. The computing system according to claim 1, wherein determining an appropriate amount of the one or more system resources that are to be allocated exclusively to the first application comprises:
    determining that the amount of the one or more system resources requested for the exclusive use of the first application is to be provided to the first application.

9. The computing system according to claim 1, wherein determining an appropriate amount of the one or more system resources that are to be allocated exclusively to the first application comprises:
    determining that providing the amount of the one or more system resources requested for the exclusive use of the first application to the first application will leave enough of the system resources for the use of the one or more second applications.

10. The computing system according to claim 1, wherein determining an appropriate amount of the one or more system resources that are to be allocated exclusively to the first application comprises:
    determining that a third application is entitled to the exclusive use of the one or more system resources in the same manner as the first application; and determining an amount of the one or more system resources to be provided to the first application that will leave enough of the one or more system resources for the exclusive use of the third application and for the use of the one or more second applications.

11. The computing system according to claim 10, wherein the first and third applications are assigned a priority for exclusive allocation of the one or more system resources such that the one of the first and third application having a higher priority is allocated a larger exclusive allocation of the one or more system resources.

12. The computing system according to claim 1, wherein determining an appropriate amount of the one or more system resources that are to be allocated exclusively to the first application comprises:

determining a resource usage history for the first application, wherein when the first application has a resource usage history of using less than the requested exclusive allocation of the one or more system resources, the first application is allocated less than the requested allocation for its exclusive use.

13. The computing system according to claim 1, wherein the computing system is further caused to perform the following:

open a broadcast channel to one or more system components of the computing system, the broadcast channel requesting that the one or more system components delay low-priority operations so that the requested exclusive allocation of the one or more system resources can be provided to the first application.

14. The computing system according to claim 1, wherein the computing system is further caused to perform the following:

determine that an overall computing system performance is below an acceptable level; and
determine a new allocation of the one or more system resources for the exclusive use of the first application that is less than a current allocation.

15. A computer system comprising:
one or more processors; and
one or more computer-readable hardware storage devices having stored thereon computer-executable instructions that, when executed by the one or more processors, instantiates:
a resource manager configured to partition one or more system resources for exclusive use of an application, wherein partitioning the one or more system resources is performed in response to a request for the partitioning, the resource the resource manager comprising:
a negotiation module configured to negotiate with the application to determine an allocation of the one or more system resources that the application desires for its exclusive use, wherein negotiating with the application includes:
receiving an inquiry about a maximum amount of the one or more system resources that can be allocated to exclusive use by the first application;
responding to the inquiry by providing the maximum amount of the one or more system resources that can be allocated to the exclusive use of the first application;
receiving information that specifies an amount of the one or more system resources that the first application desires for its exclusive use; and
determining if the first application is to be given the exclusive use of the one or more system resources specified in the received information;
an access module configured to verify that the application is authorized for the allocation of the one or more system resources for its exclusive use; and
a partitioning module configured to partition the one or more system resources so as to provide the desired allocation of the one or more system resources for the exclusive use of the application,
wherein execution of the computer-executable instructions further causes the computer system to provide an indication of a disposition of the request, the indication including information detailing which specific system resources were selected to provide the desired allocation.

16. The computer system of claim 15, wherein execution of the computer-executable instructions further causes the one or more processors to instantiate:
a monitor module configured to monitor the application for use of the allocation of the system resources for the application's exclusive use.

17. A method of allocating one or more system resources for the exclusive use of an application, the method comprising:
receiving a request for an exclusive allocation of one or more system resources for a first application, the one or more system resources being useable by the first application and one or more second applications, wherein receiving the request for the exclusive allocation of the one or more system resources comprises a negotiation process, the negotiation process comprising:
receiving an inquiry about a maximum amount of the one or more system resources that can be allocated to the exclusive use of the first application;
responding to the inquiry by providing the maximum amount of the one or more system resources that can be allocated to the exclusive use of the first application;
receiving information that specifies an amount of the one or more system resources that the first application desires for its exclusive use; and
determining if the first application is to be given the exclusive use of the one or more system resources specified in the received information;
determining an appropriate amount of the one or more system resources that are to be allocated exclusively to the first application;
partitioning the one or more system resources into a first portion that is allocated for the exclusive use of the first application and a second portion that is not allocated for the exclusive use of the first application, the second portion being available for the use of the one or more second applications; and
providing an indication of a disposition of the request, the indication including information detailing which specific system resources were selected for inclusion in the first portion.

18. The method according to claim 17, wherein the request for an exclusive allocation of the one or more system resources is received from a proxy component on behalf of the first application or is received from the first application.

* * * * *